Sept. 2, 1969  P. H. R. MATISSE  3,464,132
GRAPHIC DISPLAY
Filed Jan. 24, 1967  3 Sheets-Sheet 1
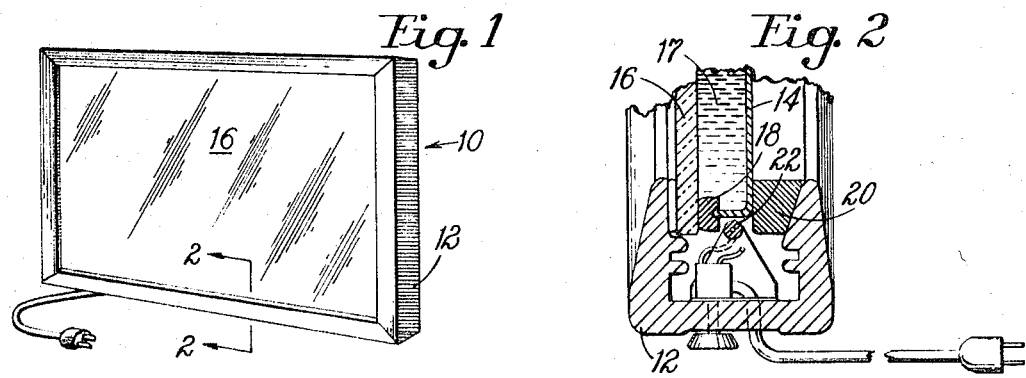
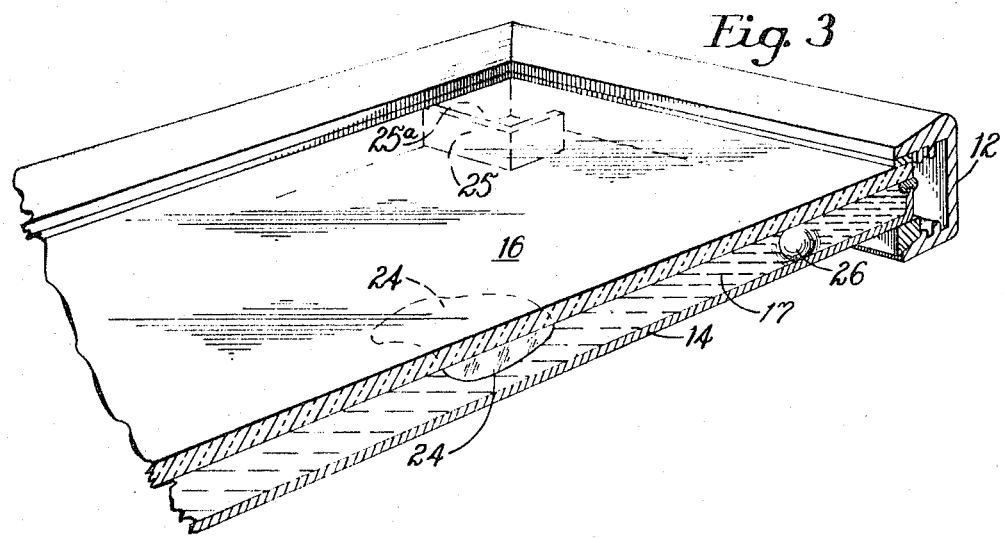
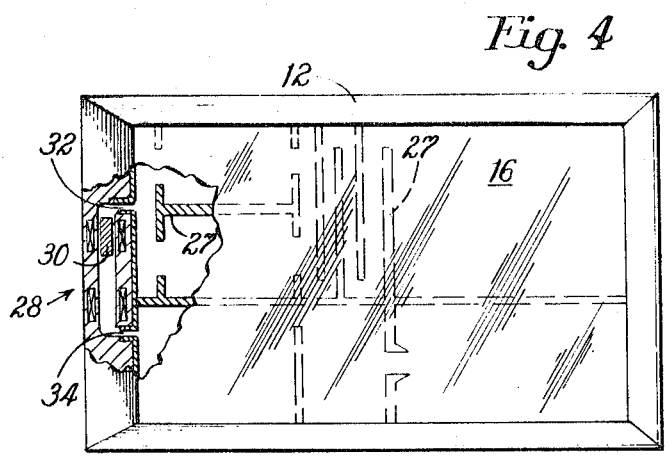

Sept. 2, 1969  P. H. R. MATISSE  3,464,132
GRAPHIC DISPLAY

Filed Jan. 24, 1967  3 Sheets-Sheet 2

Sept. 2, 1969  P. H. R. MATISSE  3,464,132
GRAPHIC DISPLAY
Filed Jan. 24, 1967  3 Sheets-Sheet 3
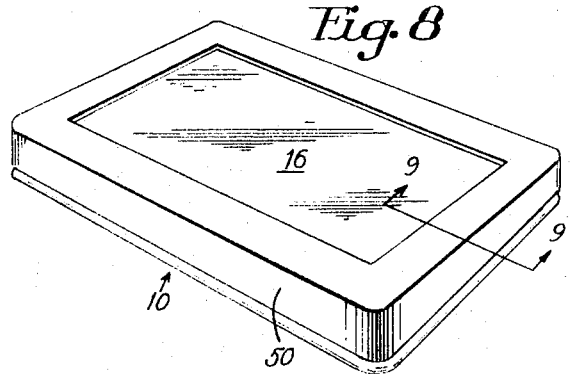
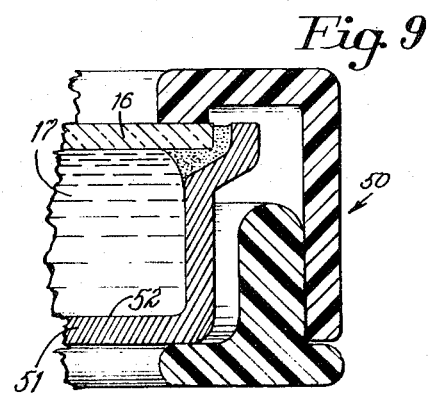
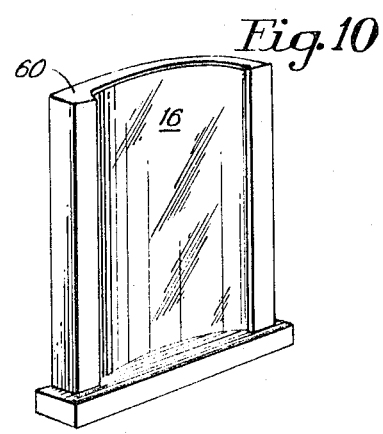
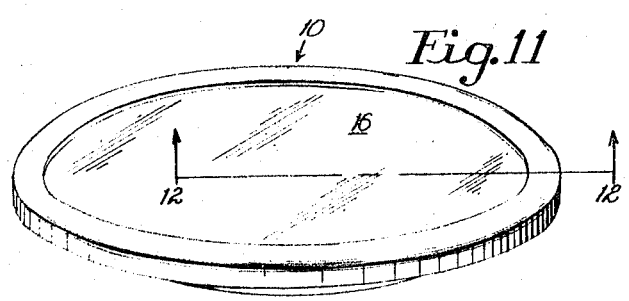
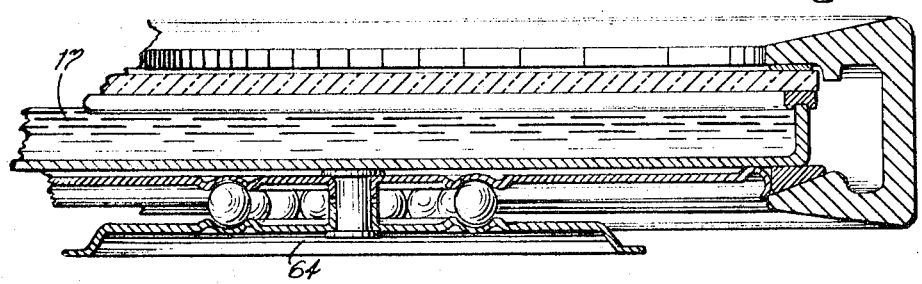

United States Patent Office 3,464,132
Patented Sept. 2, 1969

3,464,132
GRAPHIC DISPLAY
Paul Henri Robert Matisse, Cambridge, Mass., assignor, by mesne assignments, to Kalliroscope Corporation, Cambridge, Mass., a corporation of Massachusetts
Continuation-in-part of application Ser. No. 486,363, Sept. 10, 1965. This application Jan. 24, 1967, Ser. No. 611,406
Int. Cl. G09f 13/34, 3/00
U.S. Cl. 40—106.52       13 Claims

ABSTRACT OF THE DISCLOSURE

Graphic device has sealed receptacle containing a liquid suspension of minute, light-weight, transparent, very thin platelets (preferably quanine) each having a pair of generally flat light reflective surfaces, the receptacle having a transparent display wall against which the suspension is held to receive stimuli for the production of graphic patterns dependent upon patterned variation in the orientation of the platelets.

---

This application is a continuation-in-part of Ser. No. 486,363, filed Sept. 10, 1965 which has since become abandoned.

This application relates to graphic display of flowing patterns.

A primary object of the invention is to provide visually pleasing display of flowing patterns in a wide variety of ornamental, educational, and other contexts. Other objects are to provide such display in the form of a device which may be portable and of any desired size or shape; which can produce flowing patterns in response to a variety of thermal, mechanical, or electrical stimuli; and which is inexpensive and easily operated and handled.

In general the invention provides a graphic device in which a suspension of platelets in a liquid is supported against one surface of a transparent display wall that is preferably transmissive to said suspension of stimuli having intensities that are non-uniform from one localized zone to another over the area of the display wall to produce in the suspension a flowing graphic pattern visible through the display wall from the side opposite that against which the suspension is supported. In preferred embodiments a substance spectrally selectively absorptive of visible light, such as a colored dye in the liquid or a colored surface opposite the display wall, is disposed adjacent the platelets; a wall opposite the display wall has a coefficient of heat transfer less than that of the display wall; the device is mounted on a bearing for motion, said motion when the display wall is planar having a component parallel to the display wall and preferably in any case being circular motion; an energy exchanger (e.g., a movable object such as a belt in the liquid, a bubble, a vibrating element, a restriction to flow parallel to the display wall of the liquid, a heat source preferably disposed adjacent the lower edge of the display wall when vertically oriented, a flexible wall portion, etc.) has at least a portion in energy exchanging relationship with the suspension to produce flowing patterns therein; the entire device is of flexible plastic; the device is specially constructed to reduce liquid forces on the display wall; the liquid, preferably perchlorethylene or trichlorotrifluorethane, and the platelets, preferably guanine, are of substantially the same specifice gravity between 1.4 and 1.7 when the liquid is at 25° C., with a concentration of platelets in the liquid between 0.001% and 1% (preferably between 0.01% and 0.04%) by weight.

Further objects, features and advantages of the invention will be apparent from the following description of a preferred embodiment thereof, including drawings in which:

FIG. 1 is a perspective view of a vertically oriented display device of the invention;

FIG. 2 is a section through 2—2 of FIGURE 1;

FIG. 3 is a fragmentary composite view partially in section showing two further embodiments of the invention;

FIG. 4 is a plan view partially broken away in section showing a further embodiment of the invention;

FIG. 8 is a perspective view of a further embodiment of the invention;

FIG. 9 is a section through 9—9 of FIGURE 8;

FIG. 10 is a perspective view of a further embodiment of the invention;

FIG. 11 is a perspective view of a further embodiment of the invention; and

FIG. 12 is a section through 12—12 of FIGURE 11.

Figure 5:
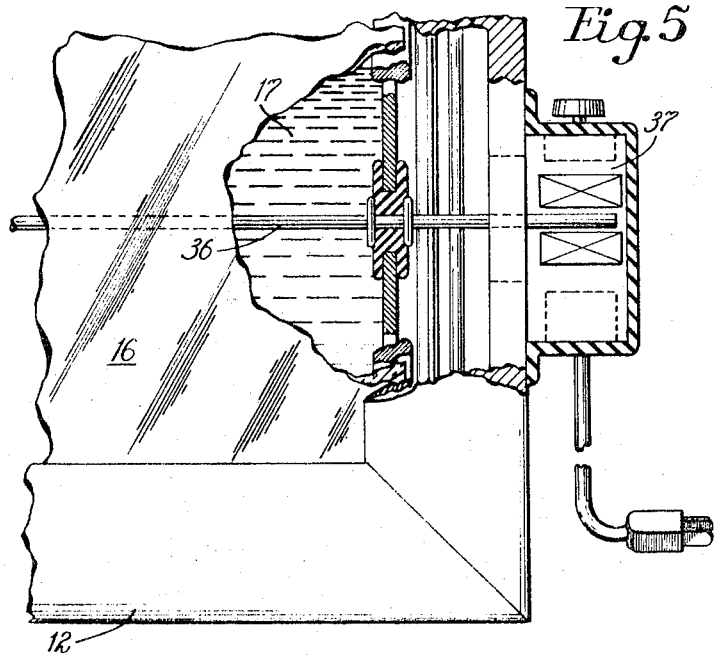
FIG. 5 is a fragmentary plan view partially broken away in section showing a further embodiment of the invention.

Graphic device 10, shown in a vertical wall hanging embodiment in FIGS. 1 and 2, includes an extruded metal outer frame 12 of generally U-shaped cross-section surrounding the periphery of thin (and here slightly flexible) walled metal pan 14 with covering transparent glass display wall 16. Wall 16 is sealed against pan 14 by gasket 18, and the framed assembly is held together by wedges 20. Space is left between the frame and the pan for accessory items such as the heating element 22 shown in FIG. 1, adjacent the lower edge of wall 16 and associated wiring or thermostat. The thermostat may have associated therewith a timer for turning the heater on and off in cycles of, e.g., ½ to 3 minutes.

Pan 14 supports against wall 16 a suspension 17 of natural guanine platelets (specific gravity 1.6) in perchlorethylene liquid (specific gravity 1.618 at 25° C.). The concentration of guanine is 0.02% by weight. Anhydrous isoproply alcohol is added in 2% concentration as an antiflocculating agent. Blue oil soluble dye is added in 0.003% concentration. The inner surface of the pan is colored red. Other color combinations may be used. The distance between the inner surface of wall 16 and the opposing surface of pan 14 is less than 2 inches, and preferably less than ½ inch, (e.g., ¼ inch), for best results.

The guanine concentration may be varied between 0.001% and 1% by weight of the liquid and is preferably between 0.01% and 0.04%. The guanine crystals have an average face dimension of 6 x 30 microns and a thickness ranging from 0.07 micron to 0.05 micron at their edges. The amount of colored dye may vary from zero up to 0.15%. The liquid may be one of several organic liquids (e.g., trichlorethane, trichlorethylene, trichlorobenzene, carbon tetrachloride, trichlorotrifluoroethane), preferably of specific gravity between 1.4 and 1.7 to match as closely as possible the specific gravity of the platelets, thereby preventing settling out of the suspension. A heavier liquid, e.g., a brominated hydrocarbon, may be used with aluminum or mica particles. Other particulate solids than the preferred guanine may be employed, provided that a pair of generally parallel flat light reflective surfaces make up the bulk of their surface area and provided they are insoluble in the liquid present. An aqueous platelet suspension may be used, with a stabilizing agent (e.g., 0.025% propylparaben USP). To avoid settling, a water-soluble salt or other high density material may be added to the aqueous suspension to increase the specific gravity of the liquid to a value approximately equal to that of the platelets (e.g., 60% by weight of potassium iodide). In some instances it may be desirable to use liquid and solids of substantially different specific gravities.

In operation, with heater 22 turned off, the application of thermal, mechanical or electrical stimuli to the suspension through display wall 16 with intensities that vary from one localized zone to another over the area of wall 16 (e.g., in the simplest case, by pressing a warm hand against the glass), will produce liquid flow under wall 16 and a reorientation, e.g., through shear forces or electrical polarization, of platelets in localized portions of the liquid. The platelets will reflect more light when their flat surfaces are parallel to wall 16 than in other orientations, and then light reflected through wall 16 will show aesthetically pleasing flowing patterns, depending upon the nature of the stimulus, the area of application, and the intensity variation over the area of wall 16. The thin dimension of the liquid layer between the display wall and the pan minimizes masking of the flow patterns by the liquid closest to wall 16.

The basic structure described may be employed in a variety of settings, e.g., as decorative wall or furniture (e.g., table or counter top) surfaces, as clock faces or other accessory surfaces, as pocket sized novelty devices, or as educational devices to illustrate thermal (heat or cold), electrical or mechanical force field principles. Examples of such applications are shown in greater detail below.

Additional effects can be obtained by use of an energy exchanger to introduce energy (e.g., in accordance with a programmed input) into the suspension to produce localized disturbances in the suspension. The heater 22 of FIG. 1 is such an exchanger. When turned on, it will slowly heat the liquid at the bottom edge of display wall 16, and the resulting temperature differential over the height of wall 16 will produce a continuous, changing, circulating flow pattern.

Many other forms of energy exchanger can be employed. In FIG. 8 a small air space is left under wall 16, resulting in a bubble 24 that will move along wall 16 when the pan is tilted or otherwise moved, producing a local disturbance along its path. To avoid plating out of the platelets on the glass, due to prolonged exposure to the air in the bubble, a baffle 25 defines a chamber 25a in which the bubble can rest when not in motion. Also shown in FIG. 3 is a small loose solid object 26 which will similarly transfer mechanical energy to the liquid upon movement of the pan. Internal baffles or flow restrictors 26 may be used (FIG. 4). A displacement pump 28 may be added, (FIG. 4) with the piston 30 alternately exhausting and introducing fluid through one of orifices 32, 34 to produce a flow pattern.

In FIG. 5 energy exchanger 36 is a wire element extending into the liquid. By driving the wire from outside the pan with an appropriate transducer 37 to produce vibrations (e.g., at a multiple of the natural frequency of the wire), a localized disturbance and corresponding flow pattern is produced. Alternatively, element 36 (or an equivalent member or surface) can act as a conductor for the introduction of thermal energy into the liquid. Similarly, static or dynamic electric fields may be created in the liquid by applying a suitable electric voltage to element 36 from any suitable source (not shown) so that the element acts as an electrode. One or more such electrodes may be mounted wholly outside the pan if desired.

Figure 6:
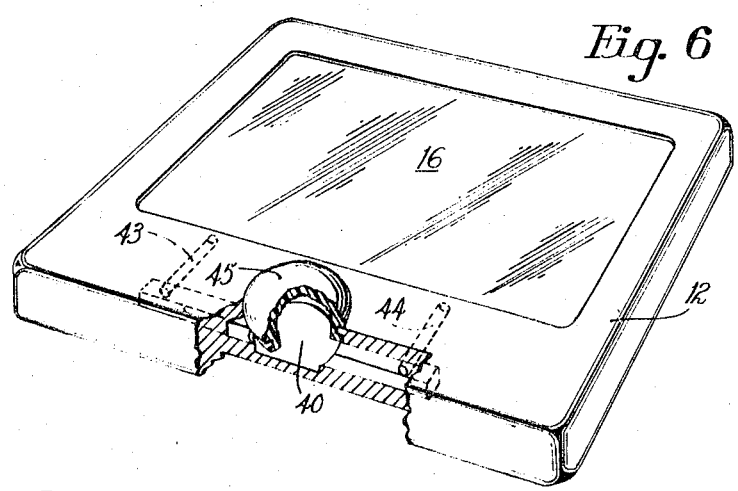
FIG. 6 is a perspective view partially broken away in section showing a further embodiment of the invention.

In FIG. 6 there is shown a pocket sized device in which frame 12 is extended in width along one edge and houses a small reservoir 40 communicating with pan 14 through conduits 43, 44. A flexible pumping insert 45 in the frame above reservoir 40 can be depressed manually to introduce energy into the suspension to produce flow patterns.

Figure 7:
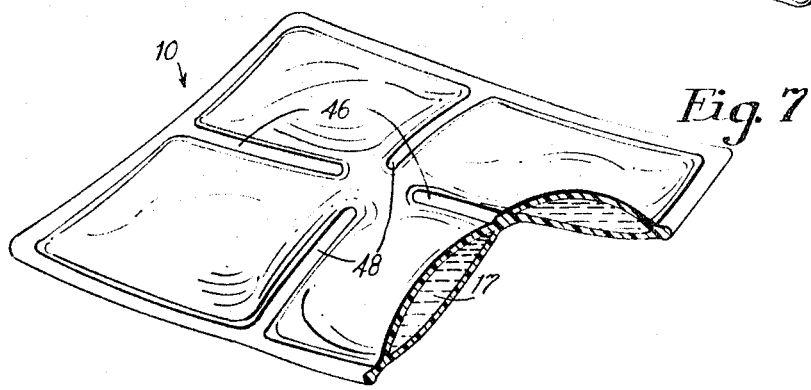
FIG. 7 is a perspective view partially broken away in section showing a further embodiment of the invention.

In FIG. 7 there is shown a completely flexible device 10 in which the display wall and the supporting structure are entirely of vinyl plastic material. The opposing walls are joined along lines 46, 48, to produce four compartments communicating with each other at the center of the device. By squeezing the device, a flow can be created between compartments.

In FIGS. 8 and 9 a 3″ x 5″ pocket-sized device or cell 10 has a two piece solvent welded molded plastic frame 50 holding the suspension against 0.08″ thick glass wall 16. The cell is sealed with an oven-cured epoxy adhesive cement. The inner surface 52 of 0.015″ thick steel wall 51, opposite wall 16, is insulated (e.g., by a plastic card) to 16. The coefficient of heat transfer of surface 52 may vary over the area of surface 52. When heat is introduced into the liquid (e.g., through wall 16 by exposure to a lamp when the cell is substantially horizontal) the resulting have a coefficient of heat transfer less than that of wall ing temperature differential between the fluid adjacent surface 52 and that adjacent wall 16 (through which most of the heat is given off) produces continuous flow.

Larger devices with the display wall extending vertically such as that of FIG. 1, are preferably filled with the liquid at atmospheric pressure at the mid-height zone of display wall 16, to minimize the total force of the liquid on that wall. One way of accomplishing this, if the walls are sufficiently rigid, is to fill the device with the liquid while it is oriented with wall 16 horizontal, seal the device completely, and then to reorient the device to the vertical.

Another way of protecting wall 16 from breakage is shown in FIG. 10. Glass wall 16 is curved and strong metal bridging 60 is provided; the bridging and liquid put the glass into tangential compression, increasing its resistance to breakage.

In FIGS. 11 and 12 the graphic device is supported on a bearing 64 for rotary motion in a plane parallel to display wall 16.

The devices described should, when being filled slowly, be filled with liquid before the addition of the platelets, to avoid their plating out on the display wall or other surface in contact with the dispersion. When filled sufficiently rapidly, or with the container fully submerged in a tank of the suspension, the platelets may be mixed with the liquid before filling.

Other embodiments (e.g., the use of multicompartment devices with different colors in the several compartments, partitions parallel to wall 16, etc.) will occur to those skilled in the art and are within the following claims:

What is claimed is:
1. A graphic device comprising
 a closed recepticle,
 a suspension in a liquid of minute, light-weight, transparent, very thin platelets each having a pair of generally flat light reflective surfaces comprising the bulk of its surface area, said liquid and said platelets being sealed in said receptacle,
 said receptacle having a transparent display wall transmissive to said suspension of stimuli having intensities that are non-uniform over the area of said wall,
 said receptacle supporting said suspension against the inner surface of said wall in position to receive said stimuli,
 said wall and said suspension being so constituted and arranged that
 said stimuli will produce in said suspension a graphic pattern dependent upon patterned variation, over the area of said wall of the orientation of said light-reflective surfaces with respect to said wall,
 said platelets will remain in suspension upon removal of said stimuli, and
 said pattern will be visible from the outside of said wall.

2. The graphic device of claim 1 wherein said liquid and said platelets have specific gravities sufficiently close to each other so that said platelets remain in suspension indefinitely.

3. The graphic device of claim 1 wherein said platelets are guanine.

4. The graphic device of claim 3 wherein said liquid is perchlorethylene.

5. The graphic device of claim 1 wherein said receptacle includes a wall portion generally parallel to a corresponding portion of said display wall and spaced therefrom by a distance less than about ½ inch.

6. The graphic device of claim 1 wherein a substance spectrally selectively absorbtive of visible light is disposed adjacent said platelets.

7. The graphic device of claim 1 wherein an energy exchanger has a portion in operative relationship with said suspension, said exchanger having a first state of substantially zero energy exchange with said suspension and a second state in which an energy exchange with said suspension produces in said suspension a flowing graphic pattern visible through said display wall.

8. The graphic device of claim 7 wherein said exchanger is a heat source disposed adjacent an edge of said display wall.

9. The graphic device of claim 1 wherein said receptacle is of flexible plastic material.

10. The graphic device of claim 1 wherein said display wall is vertical and said liquid is at atmospheric pressure at the mid-height zone of said display wall.

11. The graphic device of claim 1 wherein said liquid includes an anti-flocculating agent.

12. The graphic device of claim 1 wherein the concentration of said platelets in said liquid is between 0.001% and 1% by weight.

13. The graphic device of claim 1 wherein said receptacle is entirely filled with said liquid suspension.

References Cited

UNITED STATES PATENTS

| | | | |
|---|---|---|---|
| 996,929 | 7/1911 | Kempinski | 40—106.21 |
| 1,827,731 | 10/1931 | Churchill | 40—106.21 |
| 1,856,098 | 5/1932 | Green | 40—106.21 |
| 2,315,240 | 3/1943 | Ashenberg et al. | 40—106.21 |
| 3,271,881 | 9/1966 | Wagnon | 35—18 |
| 824,838 | 7/1906 | Atkinson | 40—310 X |

FOREIGN PATENTS

| | | |
|---|---|---|
| 689,870 | 6/1964 | Canada. |

WENCESLAO J. CONTRERAS, Primary Examiner
EUGENE R. CAPOZIO, Assistant Examiner

U.S. Cl. X.R.

40—326